May 26, 1942. J. WALLACE 2,284,077
REEL
Filed Nov. 4, 1940
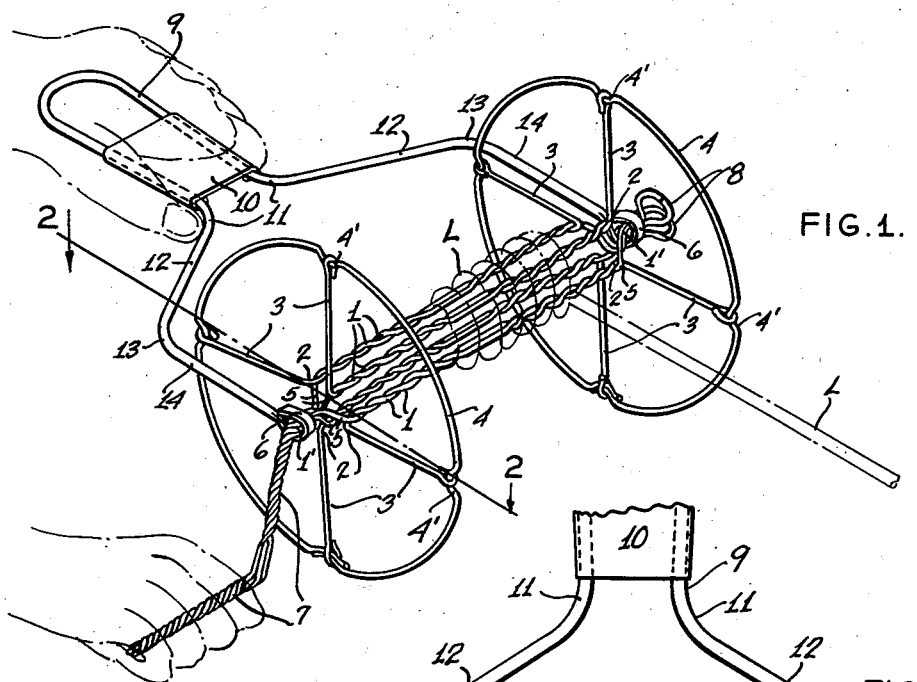
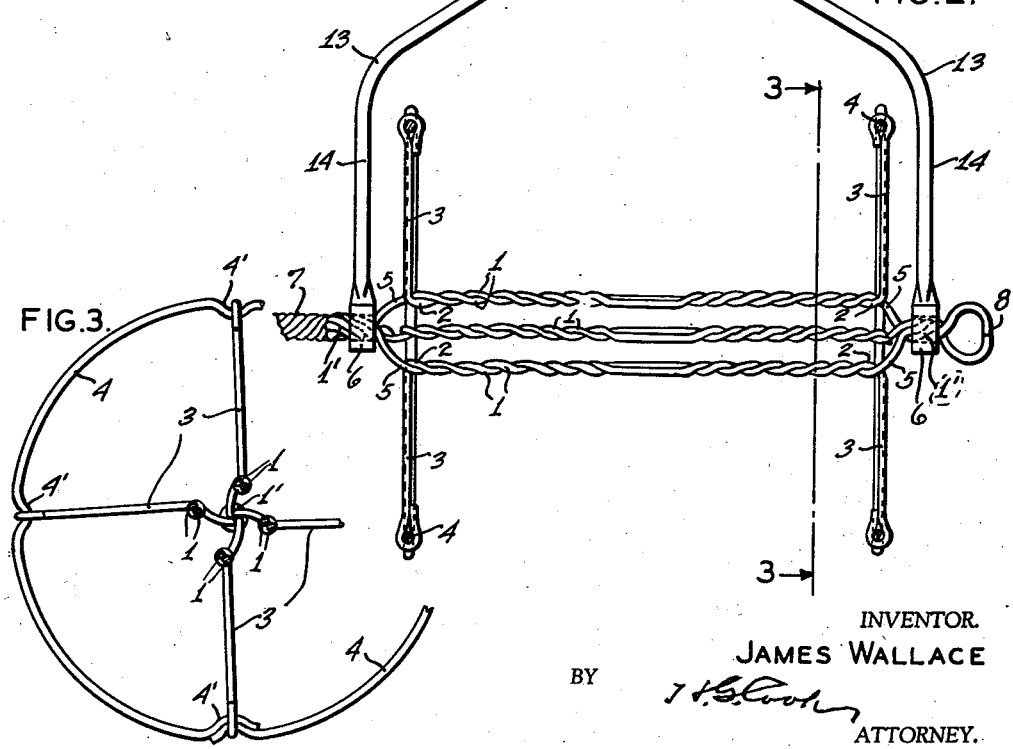
INVENTOR.
JAMES WALLACE
BY J. H. Cook
ATTORNEY.

Patented May 26, 1942

2,284,077

UNITED STATES PATENT OFFICE 2,284,077

REEL

James Wallace, St. Louis, Mo.

Application November 4, 1940, Serial No. 364,130

5 Claims. (Cl. 242—96)

This invention relates to reels, and has for its principal object the production of a device of this kind which will be strong and durable, and at the same time simple and cheap to manufacture, being formed almost entirely of wire. My invention provides for a reel which has no parts that can wear out and which is practically indestructible. By reason of its light weight and the ease with which it may be manipulated, it is especially well adapted for use in laundry work, which is usually performed by women, although it is to be understood that the invention is not limited to such use, but may be employed wherever it is desired to wind up a line, or rope, or cord. When fastening the line to a post, or the like, the reel can be conveniently suspended from the crook of the elbow by the carrying handle, leaving the hands free. When not in use, the reel can be easily put away by suspending it by its handle from a hook or nail in any convenient place.

Fig. 1 is a perspective of the reel as it appears when being used.

Fig. 2 is an enlarged view taken on the line 2—2, Fig. 1, illustrating particularly the twisting of the wires to form the core, spokes, and rotating handle.

Fig. 3 is a detail view, partly broken away, taken on the line 3—3, Fig. 2.

The invention comprises a core upon which a line is to be wound consisting of eight wires 1, which wires are twisted to form four pairs, as illustrated in Fig. 1. One of the wires 1 of each of the four pairs is bent near each of its ends at a substantially right angle, as shown at 2, to form a spoke 3 in each of the two wheels of the reel, there being a wheel at each side of the device formed of said spokes 3 and a curved wire member forming a rim 4. The rims 4 are provided with depressions 4' into which the free ends of the wires forming the spokes 3 are secured. However, said depressions 4' are not essential, and the free ends of the wire spokes 3 may be secured to the rims 4 by welding, or in any other suitable manner.

The other wire of each of the four pairs of twisted wires 1 is bent at both ends, as shown at 5 (Figs. 1 and 2) and said ends are tightly twisted together, four on each side of the reel, to form groups 1'. The tightly twisted group 1' on each side of the device is loosely mounted in a bearing 6, one of said bearings also being provided at each side of the reel. The tightly twisted groups 1' are extended, after passing through the bearings 6, to form, respectively, a rotatable handle 7 on one side of the reel and to form loops 8 at the opposite side thereof, the loops 8 serving to prevent the group 1' on that side from slipping out of its associated bearing 6.

It will be understood from the above that four of the twisted wires 1 forming the core of the reel are bent and extended at both ends to form the spokes 3 of the wheels, while the other four of said wires 1 are bent and tightly twisted together at their ends, forming the groups 1', so that they may pass through the bearings 6 to form the rotatable handle 7 on one side of the reel and the retaining loops 8 at the opposite side.

Since the handle 7 is integral with the wires 1 forming the core of the reel and is rotatable in the bearing 6, it will be seen that rotation of the handle 7 will also rotate said core.

A handle 9 is provided for convenience in carrying the reel, said handle being formed of wire preferably somewhat heavier than the wire forming the parts heretofore described, and for further convenience in grasping it, said handle has a flat, metal portion 10 (Fig. 1), which portion 10 may also, if desired, be utilized for carrying advertising matter. The wire of the handle 9 is bent at 11 to form outwardly extending arms 12, and again bent at 13 to form the portions 14 which, as will be seen by referring to Figs. 1 and 2, extend parallel with the plane of the spokes 3 and outside of the wheels, the free ends of said wires 9 being flattened and bent to form the bearings 6 through which the groups 1' of tightly twisted wires pass on each side of the reel.

For the sake of simplicity, I will describe the reel as used to wind up a clothes line. The free end of the line L is secured to the core of the reel, either by tying it to the twisted wires 1 or by passing it through said wires and knotting it so that it cannot slip away through the wires. The operator then grasps the handle 9 in his left hand, and with his right hand rotates the handle 7 (Fig. 1). As previously described, rotation of the handle 7 also rotates the core of twisted wires 1, and this rotation will automatically roll the line L about said core. The operator walks along from one clothes prop to another, turning the handle 7 and simultaneously winding the line L on the core of the reel, until all of said line is wound up. He can then, if he wishes, hang up the reel, with the line neatly wound thereon, on any convenient nail or hook, where it will be ready for use at any time.

I claim:

1. A reel comprising wheels, a core composed of a plurality of wires, some of said wires being extended to form the spokes of said wheels, and other of said wires being extended through bearings to form a rotatable handle on one side of said reel and retaining portions at the opposite side of said reel, said core being rotatable with said handle, and a carrying handle associated with said bearings.

2. A reel comprising wheels, a core composed of a plurality of wires, some of said wires being extended to form the spokes of said wheels, and other of said wires being twisted together at their free ends to form groups, one of said groups being loosely mounted in a bearing and extended therethrough to form a rotatable handle, said core being rotatable with said handle, another of said groups being loosely mounted in a bearing and extended therethrough to form retaining portions, and a carrying handle associated with said bearings.

3. A reel comprising two wheels, a core composed of a plurality of wires and located between said wheels, half of said wires being bent and extended at both of their ends to form the spokes of said wheels, the remainder of said wires being bent and twisted together at both of their ends to form groups, one of said groups being loosely mounted at one side of said reel in a bearing and extended therethrough to form integral with said core a rotatable handle so that said core is rotatable with said handle, the other of said groups being loosely mounted in a bearing at the other side of said reel and extended therethrough to form retaining loops, and a carrying handle formed integral with said bearings.

4. A reel comprising two wheels, a core composed of a plurality of wires and located between said wheels, half of said wires being bent and extended at both of their ends to form the spokes of said wheels, the remainder of said wires being bent and twisted together at both of their ends to form groups, one of said groups being loosely mounted at one side of said reel in a bearing and extended therethrough to form integral with said core a rotatable handle so that said core is rotatable with said handle, the other of said groups being loosely mounted in a bearing at the other side of said reel and extended therethrough to form retaining loops, and a carrying handle formed integral with said bearings, the rims of said wheels being provided with depressions into which the outer ends of said spokes are secured.

5. A reel comprising two wheels, a core composed of a plurality of wires and located between said wheels, half of said wires being bent and extended at both of their ends to form the spokes of said wheels, the remainder of said wires being bent and twisted together at both of their ends to form groups, one of said groups being loosely mounted at one side of said reel in a bearing and extended therethrough to form integral with said core a rotatable handle so that said core is rotatable with said handle, the other of said groups being loosely mounted in a bearing at the other side of said reel and extended therethrough to form retaining loops, and a carrying handle formed integral with said bearings, said carrying handle being provided with a flat connecting member extending from side to side thereof, the rims of said wheels being provided with depressions into which the outer ends of said spokes are secured.

JAMES WALLACE.